Sept. 22, 1931.  A. J. SORENSEN  1,824,577
ELECTRICAL TRANSLATING APPARATUS
Filed Feb. 7, 1930  2 Sheets-Sheet 1

INVENTOR:
A. J. Sorensen,
by A. R. Vincill
His Attorney

Patented Sept. 22, 1931

1,824,577

UNITED STATES PATENT OFFICE

ANDREW J. SORENSEN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL TRANSLATING APPARATUS

Application filed February 7, 1930. Serial No. 426,564.

My invention relates to electrical translating apparatus, and particularly to apparatus of the type comprising an input circuit which is at times supplied with current and an output circuit in which the flow of current is controlled in accordance with the current supplied to the input circuit.

The present case is a continuation-in-part of my co-pending application, Serial No. 303,040, filed Aug. 30, 1928, for electrical translating apparatus.

I will describe two forms of electrical translating apparatus embodying my invention, and will then point out the novel features thereof in claims.

Figure 1:
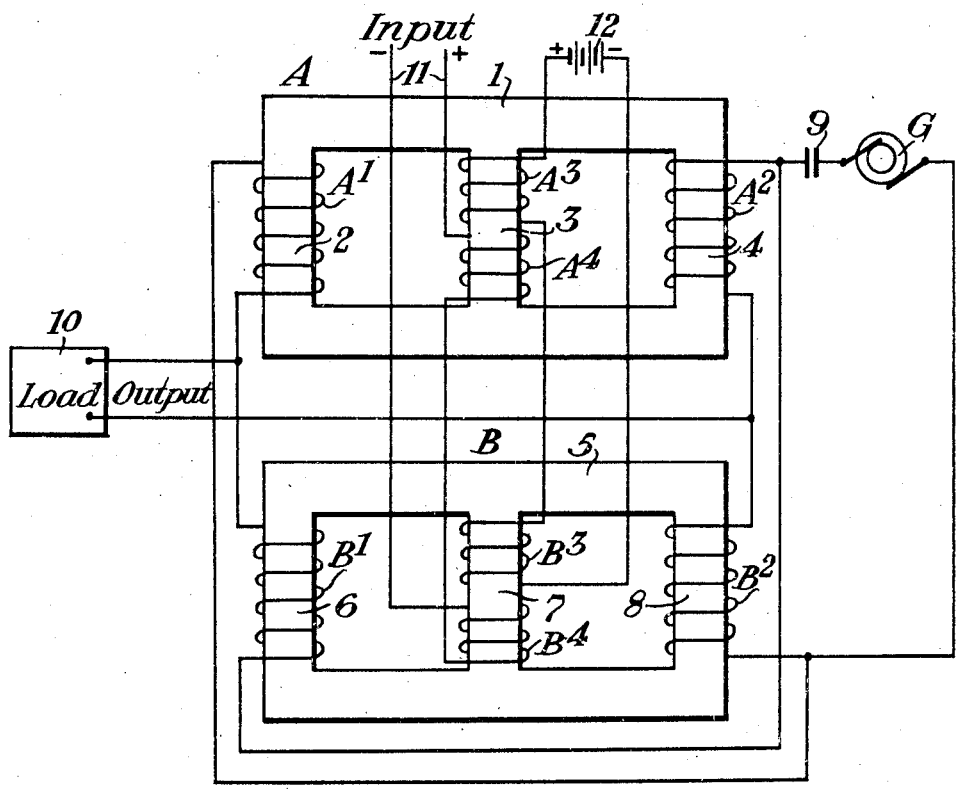
Figure 2:
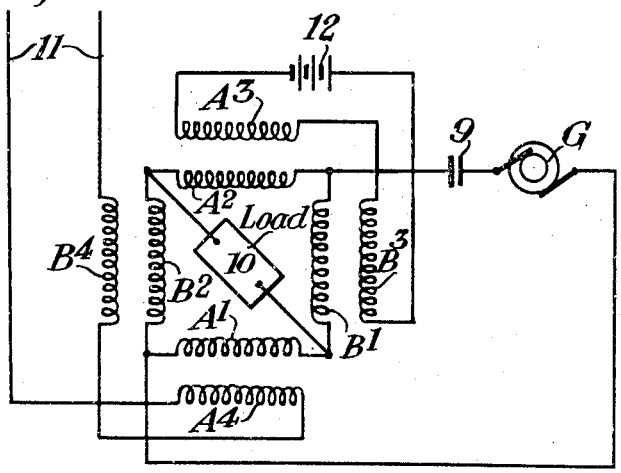
Figure 3:
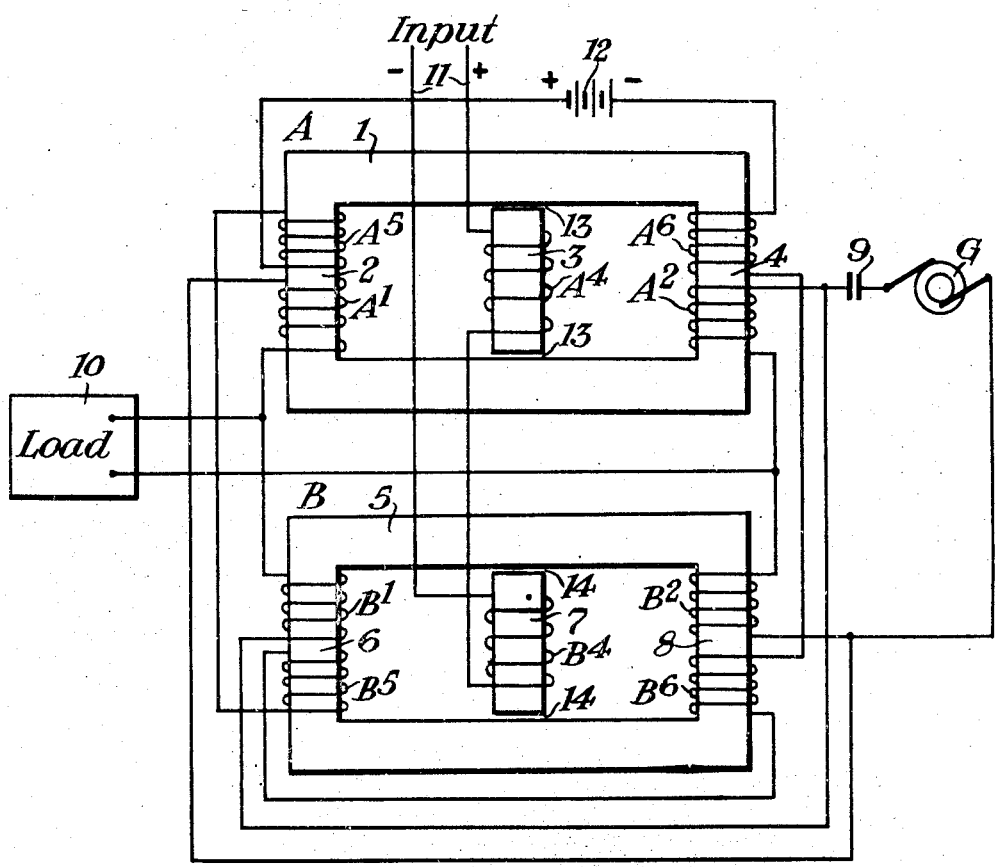

In the accompanying drawings, Fig. 1 is a diagrammatic view showing one form of apparatus embodying my invention. Fig. 2 is a schematic view showing a portion of the apparatus shown in Fig. 1 with the parts rearranged to show the electrical connections more clearly. Fig. 3 is a diagrammatic view illustrating a modified form of the apparatus shown in Fig. 1.

Similar reference characters refer to similar parts in each of the several views.

Referring first to Fig. 1, the reference character A designates a transformer comprising a magnetizable core 1 having two legs 2 and 4 provided with windings $A^1$ and $A^2$, respectively. The core 1 also comprises a member 3 which is provided with two windings $A^3$ and $A^4$.

The reference character B designates a transformer similar to transformer A and comprising a core 5 having two legs 6 and 8 provided with windings $B^1$ and $B^2$, respectively. Furthermore, the core 5 is provided with a member 7 having located thereon two windings $B^3$ and $B^4$.

Windings $A^1$ and $A^2$ of transformer A and windings $B^1$ and $B^2$ of transformer B are supplied with alternating current from a suitable source such as an alternator G. Referring now also to Fig. 2, it will be seen that the windings $A^1$, $A^2$, $B^1$ and $B^2$ are connected in a closed circuit to form a bridge similar to the well known Wheatstone bridge. The generator G is connected, through a condenser 9, across two opposite corners of this bridge. The two remaining corners of the bridge supply current to the output circuit here shown as containing a load 10. It will be seen that the alternating current in winding $A^1$ creates an alternating flux in a path including leg 2 and member 3 of core 1. Furthermore, alternating current in winding $A^2$ creates, in core 1, an alternating flux through a path including leg 4 and member 3. The parts are so proportioned and connected that the alternating fluxes in the two paths just traced are in opposition in the member 3. In similar manner, windings $B^1$ and $B^2$ are so connected that the alternating flux created by current in winding $B^1$ and the alternating flux created by current in winding $B^2$ are in opposition in member 7 of core 5.

The windings $A^4$ and $B^4$ are connected in series in an input circuit designated in general by the reference character 11, which is at times supplied with unidirectional current of varying magnitude. If the input current, by means of which it is desired to control the apparatus, is alternating current, rectifiers may be inserted in the input circuit.

The initial permeabilities of the cores 1 and 5 are adjusted to their optimum values by means of the biasing windings $A^3$ and $B^3$ which are connected in series with a suitable source of direct current such as a battery 12.

The various parts are so proportioned that for normal values of the input current, the output current has its desired value and there is no alternating flux in members 3 and 7. In actual practice, the normal value of the input current will usually be considered as zero, and it will be desirable for the current in load 10 to be zero for this condition. The parts are therefore proportioned in such manner that the bridge formed by windings $A^1$, $A^2$, $B^1$ and $B^2$ is balanced when the current in the input circuit is zero.

As shown in the drawings, cores 1 and 5 are symmetrical, so that windings $A^1$ and $A^2$ and windings $B^1$ and $B^2$ should have the same number of turns in order to neutralize the alternating fluxes in members 3 and 7, but this arrangement is not essential. For example, if the reluctance of the path including leg 2 and member 3 of core 1 were greater than the reluctance of the path including leg 4 and member 3, the alternating fluxes could still be made to equalize by constructing winding $A^1$ with a greater number of turns than $A^2$.

The windings $A^4$ and $B^4$, which are included in the input circuit, are so connected that the fluxes created by current in the input circuit aid the biasing flux in one transformer, for example, in transformer A, but opposes the biasing flux in the other transformer B. With the parts constructed in the manner previously described, it will be seen that when input current is zero, the bridge including windings $A^1$, $A^2$, $B^1$ and $B^2$ is balanced, so that no current flows in the load 10. If, however, current is supplied to the input circuit, this current flows through windings $A^4$ and $B^4$. The unidirectional flux thus created in member 3 of core 1 aids the unidirectional flux normally created in this core by current in winding $A^3$. As a result, the impedances of windings $A^1$ and $A^2$ are decreased, the amount of this decrease depending upon the magnitude of the input current. The input current in winding $B^4$, on the other hand, produces a unidirectional flux which opposes the unidirectional flux normally created in core 5 by current in winding $B^3$. It follows that the resultant flux in core 5 is decreased and that the impedances of windings $B^1$ and $B^2$ are correspondingly increased, the amount of this increase depending upon the magnitude of the input current. From an inspection of Fig. 2, it will be plain that the effects of decreasing the impedances of windings $A^1$ and $A^2$ and increasing the impedances of windings $B^1$ and $B^2$ are all additive and combine to unbalance the bridge in the same direction. The net result of these changes is therefore to increase the current in the load 10. In similar manner if the current in the input circuit decreases, the impedances of windings $A^1$ and $A^2$ increase, and the impedances of windings $B^1$ and $B^2$ decrease. It will be manifest, therefore, that any change in the input current causes a corresponding change in the current supplied to the load 10.

It should be pointed out that the fluxes created in the transformers by the biasing windings should be so adjusted that the maximum value of the input current will not create a unidirectional flux which will completely neutralize the biasing flux. Nor, on the other hand, should the parts be so proportioned that the maximum value of the input current will carry the iron of a transformer to the point of saturation. If the iron does become saturated, the output of the apparatus will be distorted, and this is particularly undesirable in case the input current is periodically varied as when apparatus embodying my invention is employed to amplify coded currents of the type employed in some systems of automatic train control.

In order to prevent saturation of the transformer iron by high values of input current, the apparatus may be constructed as shown in Fig. 3, in which the common portion of core 1 including the member 3 contains two air gaps 13 by means of which the member 3 is spaced from the rest of the core. In similar manner member 7 is separated, by air gaps 14, from the remainder of core 5. This construction assists materially in preventing saturation of the transformer iron by excessive values of input current.

With the transformers containing air gaps as shown in Fig. 3, I have discovered that the operation may be improved, in some instances, by employing two biasing windings $A^5$ and $A^6$ located on legs 2 and 4 respectively of core 1 and supplied with current from battery 12 in such manner that the fluxes created thereby flow in the same direction in member 3. Similarly, biasing windings $B^5$ and $B^6$ located on legs 6 and 8, respectively, of core 5 are connected in series with windings $A^5$ and $A^6$ and are so disposed that the fluxes created in core 5 by current in windings $B^5$ and $B^6$ flow in the same direction in member 7.

With the biasing windings located on the other legs of the cores as shown in Fig. 3, substantially all of the biasing flux created by current in winding $A^5$ threads leg 2, and substantially all of the flux created by current in winding $A^6$ threads leg 4, so that these windings insure that the iron is worked at the proper point on the saturation curve. Due in part to the air gaps 13 however, a portion of the biasing flux will traverse an air return path and will not link member 3. It follows that for a given level of biasing flux, there will be less biasing flux in member 3 with the arrangement shown in Fig. 3 than would be the case if the biasing winding were located on the member 3 as shown in Fig. 1. The parts can therefore be ararnged to permit high biasing fluxes in the outer legs of the core to permit operation of the apparatus with large input currents, while permitting with the same adjustment of parts, a lower biasing flux in the member 3 to give a more satisfactory operation with low input currents. The operation of transformer B is the same as described above for transformer A.

One purpose of condenser 9 is to compensate for the reactive impedance of the windings supplied with alternating current from the generator G, and therefore to decrease the amount of power required by the apparatus. It is manifest, however, that the operation of the apparatus will be unaffected if the condenser 9 is omitted.

One advantage of the apparatus embodying my invention is that, within comparatively wide limits, the apparatus is substantially independent of variations in the electromotive force supplied to the circuit including the biasing windings. Furthermore, the apparatus is substantially unaffected by variations in the electromotive force of generator G. That is to say, since the load 10 is supplied with energy from a bridge which balances windings $A^2$ and $B^2$ against windings $A^1$ and $B^1$, any change caused in the potential drop across one of these windings due to a variation in the alternating electromotive force is exactly compensated for, by a corresponding change in the remaining windings of the bridge.

Another advantage possessed by the apparatus embodying my invention is that the parts may be so arranged that a comparatively small change in input current will cause a comparatively large change in the current supplied to load 10 of the output circuit. Furthermore, in such apparatus, the change in the output current due to a change in the input current is practically independent of the total output current. In other words, the apparatus permits a comparatively large percentage change in output current.

Although I have herein shown and described only two forms of electrical translating apparatus embodying my invention, it is understood that various changes and modifications may be made therein within the scope of the appended claims without departing from the spirit and scope of my invention.

Having thus described my invention, what I claim is:

1. In combination, a core carrying a first and a second winding, a third winding, a load connected across said first and third windings, a fourth winding connected in series with said second winding across said load to form a bridge having said first and second windings in opposite arms and having said load connected across two corners of the bridge, a source of alternating current connected across the remaining corners of said bridge, and an input circuit inductively related with said core and operating when supplied with current to cause similar changes in the impedances of said first and second windings.

2. In combination, a magnetizable core comprising two magnetic paths having a member in common, a first and a second winding located in inductive relation with said two paths, respectively, a third winding, a load connected across said first and third windings in series, a fourth winding connected in series with said second winding across said load to form a bridge having said first and second windings in opposite arms and having said load connected across opposite corners, a source of alternating current connected across the remaining corners of such bridge, said first and second windings being so connected that the fluxes created in said two paths by alternating currents in the associated windings are in opposition in said member, and an input circuit inductively related with said member and operating when supplied with current to vary the permeability of said two paths.

3. In combination, a magnetizable core comprising two magnetic paths having a member in common, a first and a second winding located in inductive relation with said two paths, respectively, a third winding, a load connected across said first and third windings in series, a fourth winding connected in series with said second winding across said load to form a bridge having said first and second windings in opposite arms and having said load connected across opposite corners, a source of alternating current connected across the remaining corners of such bridge, said first and second windings being so connected that the fluxes created in said two paths by alternating currents in the associated windings are in opposition in said member, means for creating a substantially constant unidirectional flux in said member, and an input circuit inductively related with said member and operating when supplied with current to create an additional unidirectional flux in said member.

4. In combination, a first core carrying two windings, a second core carrying two windings, said four windings being connected in a closed circuit to form a bridge, a load connected across two opposite corners of said bridge, a source of alternating current connected across the other two corners of said bridge, and means including an input circuit inductively related with both said cores and operating when supplied with current to produce opposite changes in the permeabilities of said cores.

5. In combination, a first core carrying two windings, a second core carrying two windings, said four windings being connected in a closed circuit to form a bridge, a load connectd across two opposite corners of said bridge, a source of alternating current connected across the other two corners of said bridge, and an input circuit inductively related with both said cores and operating when supplied with current to vary the permeabilities of both said cores in accordance with the magnitude of such current.

6. In combination, a first core carrying two windings, a second core carrying two windings, said four windings being connected in a closed circuit to form a bridge, a load connected across two opposite corners of said bridge, a source of alternating current connected across the other two corners of said bridge, means for producing a unidirectional biasing flux in each of said cores, and an input circuit operating when supplied with current to produce an additional unidirectional flux in each said core in accordance with the magnitude of such current, said biasing and additional fluxes being additive in one core and in opposition in the other core.

7. In combination, two magnetizable cores each comprising two magnetic paths having a member in common, a first and a second winding inductively related with the two paths respectively of the first core, a third and a fourth winding inductively related with the two paths respectively of the second core, means for connecting said four windings in a closed circuit to form a bridge, a load connected across two opposite corners of said bridge, a source of alternating current connected across the remaining corners of said bridge, the parts being so connected that the alternating fluxes in the two paths of each core are in opposition in the corersponding common member, means for creating a substantially constant unidirectional biasing flux in each core, and means for at times producing an additional unidirectional flux in each such common member in such direction that the biasing and additional fluxes are in opposition in one core and are additive in the other core.

8. In combination, two magnetizable cores each comprising two magnetic paths having a member in common, a first and a second winding inductively related with the two paths respectively of the first core, a third and a fourth winding inductively related with the two paths respectively of the second core, means for connecting said four windings in a closed circuit to form a bridge, a load connected across two opposite corners of said bridge, a source of alternating current connected across the remaining corners of said bridge, the parts being so connected that the alternating fluxes in the two paths of each core are in opposition in the corresponding common member, means for creating a substantially constant unidirectional biasing flux in each core, and an input circuit inductively related with both said cores and operating when supplied with current to vary the impedances of said four windings in accordance with the magnitude of such current and in such manner that all such variations in impedance are cumulative in their effect upon the balance of said bridge.

9. In combination, a transformer comprising three magnetizable legs connected in parallel, two windings located on the outer legs, respectively, of said transformer, a load, means including said two windings for supplying alternating current to said load, means for separately supplying to said outer leg fluxes which flow in the same direction in the remaining leg of said transformer, and an input winding on said remaining leg operating when supplied with current to vary the impedances of said two windings.

10. In combination, a transformer comprising two magnetic paths having a member in common, two windings inductively related with said two paths respectively, a load, means including said two windings for supplying alternating current to said load, means for separately creating in said two paths fluxes which flow in the same direction in said member, and an input winding located on said leg and operating when supplied with current to vary the impedances of said two windings.

11. In combination, a transformer comprising two magnetic paths having in common a portion containing an air gap, two windings inductively related with said paths respectively, a load, means including said windings for supplying alternating current to said load, means for separately creating in said two paths fluxes which flow in the same direction in said common portion, and an input winding located on said common portion and operating when supplied with current to vary the reluctances of both said paths.

12. In combination, a transformer comprising two magnetic paths having in common a portion containing an air gap, two windings inductively related with said paths respectively, a load, means including said windings for supplying alternating current to said load, two other windings located on said two paths respectively, means for supplying said two other windings with current in such manner as to create fluxes which flow through said common portion in the same direction, and an input winding on said common portion operating when supplied with current to vary the impedances of both said paths.

13. In combination, a transformer comprising two magnetic paths having in common a portion containing an air gap, a first and a second winding located in inductive relation with said two paths respectively, a third winding, a load connected across said first and third windings in series, a fourth winding connected in series with said second winding across said load to form a bridge having said first and second windings in opposite arms and having said load connected across opposite corners, a source of alternating current connected across the remaining corners of such bridge, and an input circuit inductively related with said common portion and operating when supplied with current to vary the permeabilities of said two paths.

14. In combination, a transformer comprising two magnetic paths having in common a portion containing an air gap, a first and a second winding located in inductive relation with said two paths respectively, a third winding, a load connected across said first and third windings in series, a fourth winding connected in series with said second winding across said load to form a bridge having said first and second windings in opposite arms and having said load connected across opposite corners, a source of alternating current connected across the remaining corners of such bridge, means for separately creating in said two paths fluxes which flow in the same direction through said common portion, and an input circuit inductively related with said common portion and operating when supplied with current to vary the permeabilities of said two paths.

15. In combination, two transformers each comprising two magnetic paths having in common a portion containing an air gap, a first and a second winding inductively related with the two paths respectively of the first transformer, a third and a fourth winding inductively related with the two paths respectively of the second transformer, means for connecting said four windings in a closed circuit to form a bridge, a load connected across two opposite corners of said bridge, a source of alternating current connected across the remaining corners of said bridge, the parts being so connected that the alternating fluxes in the two paths of each transformer are in opposition in the corresponding common portion, means for separately creating a substantially constant biasing flux in the two paths of each transformer, and an input circuit inductively related with both said common portions and operating when supplied with current to vary the impedances of said four windings in such manner that all such variations in impedance are additive in their effect upon the balance of said bridge.

In testimony whereof I affix my signature.

ANDREW J. SORENSEN.